(12) United States Patent
Matsuo et al.

(10) Patent No.: US 9,515,450 B2
(45) Date of Patent: Dec. 6, 2016

(54) AMPLIFYING OPTICAL FIBER AND OPTICAL AMPLIFIER

(71) Applicants: FUJIKURA LTD., Tokyo (JP); NIPPON TELEGRAPH AND TELEPHONE CORPORATION, Tokyo (JP); OSAKA PREFECTURE UNIVERSITY PUBLIC CORPORATION, Sakai-shi, Osaka (JP); NATIONAL UNIVERSITY CORPORATION SHIMANE UNIVERSITY, Matsue-shi, Shimane (JP)

(72) Inventors: Shoichiro Matsuo, Sakura (JP); Katsuhiro Takenaga, Sakura (JP); Kentaro Ichii, Sakura (JP); Hirotaka Ono, Mito (JP); Kyouzou Tsujikawa, Tsukuba (JP); Makoto Yamada, Sakai (JP); Hiroji Masuda, Matsue (JP)

(73) Assignees: FUJIKURA LTD., Tokyo (JP); NIPPON TELEGRAPH AND TELEPHONE CORPORATION, Tokyo (JP); OSAKA PREFECTURE UNIVERSITY PUBLIC CORPORATION, Sakai-shi, Osaka (JP); NATIONAL UNIVERSITY CORPORATION SHIMANE UNIVERSITY, Matsue-shi, Shimane (JP)

( * ) Notice: Subject to any disclaimer, the term of this patent is extended or adjusted under 35 U.S.C. 154(b) by 0 days.

(21) Appl. No.: 14/440,984

(22) PCT Filed: Oct. 31, 2013

(86) PCT No.: PCT/JP2013/079643
§ 371 (c)(1),
(2) Date: May 6, 2015

(87) PCT Pub. No.: WO2014/073458
PCT Pub. Date: May 15, 2014

(65) Prior Publication Data
US 2015/0318659 A1 Nov. 5, 2015

(30) Foreign Application Priority Data

Nov. 7, 2012 (JP) ................................. 2012-245300

(51) Int. Cl.
*H01S 3/067* (2006.01)
*G02B 6/02* (2006.01)
(Continued)

(52) U.S. Cl.
CPC ....... *H01S 3/06737* (2013.01); *G02B 6/02042* (2013.01); *G02B 6/036* (2013.01);
(Continued)

(58) Field of Classification Search
CPC ........... H01S 3/06737; H01S 3/06754; H01S 3/06733; G02B 6/02042
See application file for complete search history.

(56) References Cited

U.S. PATENT DOCUMENTS 7,289,707 B1 * 10/2007 Chavez-Pirson ........ G02B 6/06
385/116

(Continued)

FOREIGN PATENT DOCUMENTS

EP 2765661 A1 8/2014
JP 2005-500538 A 1/2005
(Continued)

OTHER PUBLICATIONS

Website https://www.rp-photonics.com/mode_radius.html?s=ak, accessed on Feb. 8, 2016.*
(Continued)

*Primary Examiner* — Eric Bolda
(74) *Attorney, Agent, or Firm* — Westerman, Hattori, Daniels & Adrian, LLP

(57) ABSTRACT

A plurality of cores 51 is disposed around the center axis of a first cladding 52 in a state in which an inter-core distance Λ of cores adjacent to each other is equal, a refractive index $n_1$ of the core 51 is provided higher than a refractive index $n_2$ of the first cladding 52, and the refractive index $n_2$ of the first cladding 52 is provided higher than a refractive index $n_3$ of a second cladding 53. Moreover, $5.8 \leq \Lambda/MFD(2\lambda c/(\lambda c+\lambda op)) \leq 8$ is satisfied, where the inter-core distance is defined as Λ, a mode field diameter of the core is defined as MFD, a cutoff wavelength is defined as λc, and a wavelength of communication light incident on the core 51 is defined as λop.

9 Claims, 13 Drawing Sheets

(51) Int. Cl.
*G02B 6/036* (2006.01)
*H01S 3/094* (2006.01)
*G02B 6/04* (2006.01)
*H01S 3/23* (2006.01)

(52) U.S. Cl.
CPC ............. *G02B6/03633* (2013.01); *G02B 6/04* (2013.01); *H01S 3/06754* (2013.01); *H01S 3/094007* (2013.01); *H01S 3/06733* (2013.01); *H01S 3/2383* (2013.01)

(56) References Cited

U.S. PATENT DOCUMENTS

| | | | |
|---|---|---|---|
| 2009/0154503 A1* | 6/2009 | Peyghambarian | H01S 3/067 372/6 |
| 2009/0201575 A1 | 8/2009 | Fermann et al. | |
| 2011/0279888 A1 | 11/2011 | Fini et al. | |
| 2012/0195563 A1* | 8/2012 | Takenaga | G02B 6/02042 385/126 |
| 2013/0063809 A1* | 3/2013 | Nishihara | H01S 3/06737 359/341.2 |
| 2014/0240819 A1* | 8/2014 | Tsuchida | G02B 6/02042 359/341.33 |

FOREIGN PATENT DOCUMENTS

| | | |
|---|---|---|
| JP | 2005-500583 A | 1/2005 |
| JP | 2011-512653 A | 4/2011 |
| JP | 2013-58651 A | 3/2013 |
| WO | 03/016958 A2 | 2/2003 |
| WO | 03/019257 A1 | 3/2003 |
| WO | 2011/024808 A1 | 3/2011 |
| WO | 2011/116075 A1 | 9/2011 |
| WO | 2013/051655 A1 | 4/2013 |

OTHER PUBLICATIONS

Mimura et al., "Batch Multicore Amplification with Cladding-Pumped Multicore EDF", IEICE Technical Report, Oct. 18, 2012, vol. 112, No. 258 (OCS2012-41-75), pp. 151-154, Cited in JP Decision to Grant a Patent dated Sep. 30, 2014 and ISR.

Matsuo et al., "Large-effective-area ten-core fiber with cladding diameter of about 200μm", Optics Letters, vol. 36, No. 23, Dec. 1, 2011, pp. 4626-4628.

Koshiba et al., "Multi-core fiber design and analysis: coupled-mode theory and coupled-power theory", Optics Express B102, vol. 19, No. 26, Dec. 12, 2011 (10 pages).

Decision to Grant a Patent dated Sep. 30, 2014, issued in corresponding Japanee Patent Application No. 2012-245300, with English translation (5 pages).

International Search Report mailed Jan. 28, 2014 in International Application PCT/JP2013/079643.

Mimura et al., "Batch Multicore Amplification with Cladding-Pumped Multicore EDF", IEICE Technical Report, Oct. 18, 2012, XP055254482.

Extended European Search Report mailed Jun. 30, 2016 in European Application 13853089.4.

* cited by examiner

AMPLIFYING OPTICAL FIBER AND OPTICAL AMPLIFIER

TECHNICAL FIELD

The present invention relates to an amplifying optical fiber and an optical amplifier that are preferable in the case where a multicore fiber is used for a transmission line.

BACKGROUND ART

In order to construct an optical communication system using a multicore fiber for a transmission line, an optical amplifier that amplifies communication light is essential. For a typical optical amplifier, it is widely known to use an erbium doped fiber (EDF).

On the other hand, Patent Document 1 below is proposed as a multicore EDF. The multicore EDF described in this Patent Document 1 is configured for use for the purpose of the amplification of laser light.

CITATION LIST

Patent Document

[Patent Document 1] JP-A-2005-500538

SUMMARY OF INVENTION

Objects to be Achieved by the Invention

However, in the case where the multicore EDF according to Patent Document 1 is used for the purpose of the amplification of communication light, which is signal light for communication, it is assumed that crosstalk is taken place between cores adjacent to each other and trouble arises in communication caused by the crosstalk.

Therefore, it is an object of the present invention to provide an amplifying optical fiber and an optical amplifier that can amplify communication light while suppressing crosstalk.

Means for Achieving the Objects

An amplifying optical fiber according to the present invention to solve the object is an amplifying optical fiber including: a plurality of cores to which an active element is doped; a first cladding enclosing the plurality of cores with no gap; and a second cladding enclosing the first cladding. The plurality of cores is disposed around a center axis of the first cladding in a state in which an inter-core distance between cores adjacent to each other is equal, a refractive index of the core is provided higher than a refractive index of the first cladding, the refractive index of the first cladding is provided higher than a refractive index of the second cladding, and an expression below is satisfied:

$$5.8 \leq \Lambda/MFD(2\lambda c/(\lambda c + \lambda op)) \leq 8 \quad (1)$$

where the inter-core distance is defined as $\Lambda$, a mode field diameter of the core is defined as MFD, a cutoff wavelength is defined as $\lambda c$, and a wavelength of communication light incident on the core is defined as $\lambda op$.

It is found through experiments conducted by the present inventors that in the case where $\Lambda/MFD(2\lambda c/(\lambda c + \lambda op))$ is 5.8 or more, such an amount of crosstalk is achieved that the amount of crosstalk is reduced below −30 dB at which substantial trouble does not arise in communication. Therefore, in accordance with the amplifying optical fiber according to the present invention, it is possible to prevent trouble from arising in communication caused by crosstalk. On the other hand, it is found through experiments conducted by the present inventors that in the case where $\Lambda/MFD(2\lambda c/(\lambda c + \lambda op))$ is eight or less, the amount of crosstalk can be suppressed to the extent that substantial trouble does not arise in communication even though the outer diameter of the first cladding is 225 μm or less in order to suppress the probability of breaking of the optical fiber. Therefore, in accordance with the amplifying optical fiber according to the present invention, it is possible to practically prevent trouble from arising in communication caused by crosstalk.

Accordingly, it is possible to achieve an amplifying optical fiber that amplifies communication light while suppressing crosstalk.

Moreover, preferably, the first cladding has a two-layer structure formed of a solid inner layer passed through the center axis of the first cladding and an outer layer enclosing the inner layer and the plurality of cores with no gap, and a refractive index of the inner layer is provided lower than a refractive index of the outer layer.

It is found by the present inventors that in the case where this configuration is provided, when the area other than the center axis of the first cladding in the area located on the inner side with respect to the plurality of cores is the incident point of pumping light on one end face of the first cladding, pumping light propagated through the core is increased as compared with the case where the center axis of the first cladding is defined as the incident point of pumping light. Therefore, it is possible to improve the density of pumping light individually in the cores, and as a result, it is possible to improve the efficiency of the amplification of communication light.

Moreover, it is fine that the incident point of pumping light is located in the area other than the center axis of the first cladding in the area located on the inner side with respect to the plurality of cores on one end face of the first cladding as described above. However, preferably, the incident point of pumping light may be an outer layer area on one end face of the first cladding, or may be an area other than a inner layer area located on an inner side with respect to the plurality of cores in the outer layer area.

It is found by the present inventors that in the case where this configuration is provided, pumping light can be concentrated on the outer layer in which the core is provided as the most part of the pumping light is not distributed in the inner layer. Therefore, it is possible to further improve the density of pumping light in the cores, and as a result, it is possible to further improve the efficiency of the amplification of communication light.

Moreover, an optical amplifier according to the present invention is an optical amplifier including: an amplifying optical fiber including: a plurality of cores to which an active element is doped; a first cladding enclosing the plurality of cores with no gap; and a second cladding enclosing the first cladding; a pumping light source configured to emit pumping light for pumping the active element; a plurality of single core optical fibers to which communication light is entered; and an optical Fan-In configured to enter communication light incident on cores of the plurality of single core optical fibers to an end face of a core of the amplifying optical fiber corresponding to the core and to enter pump light emitted from the pumping light source to a predetermined position on one end face of the amplifying optical fiber. The plurality of cores is disposed around a center axis of the first cladding in a state in which an inter-core distance between cores adjacent to each other is equal, a refractive index of the core is provided higher than a refractive index of the first cladding, the refractive index of the first cladding is provided higher than a refractive index of the second cladding, and expression (1) above is satisfied, where the inter-core distance is defined as $\Lambda$, a mode field diameter of the core is defined as MFD, a cutoff wavelength is defined as $\lambda c$, and a wavelength of communication light incident on the core is defined as $\lambda op$.

It is found through experiments conducted by the present inventors that in the case where $\Lambda/\text{MFD}(2\lambda c/(\lambda c+\lambda op))$ is 5.8 or more, such an amount of crosstalk is achieved that the amount of crosstalk is reduced below −30 dB at which substantial trouble does not arise in communication. Therefore, in accordance with the optical amplifier according to the present invention, it is possible to prevent trouble from arising in communication caused by crosstalk.

On the other hand, it is found through experiments conducted by the present inventors that in the case where $\Lambda/\text{MFD}(2\lambda c/(\lambda c+\lambda op))$ is eight or less, the amount of crosstalk can be suppressed to the extent that substantial trouble does not arise in communication even though the outer diameter of the first cladding is 225 µm or less in order to suppress the probability of breaking of the optical fiber. Therefore, in accordance with the optical amplifier according to the present invention, it is possible to practically prevent trouble from arising in communication caused by crosstalk.

Accordingly, it is possible to achieve an optical amplifier that amplifies communication light while suppressing crosstalk.

Moreover, preferably, the first cladding has a two-layer structure formed of a solid inner layer passed through the center axis of the first cladding and an outer layer enclosing the inner layer and the plurality of cores with no gap, a refractive index of the inner layer is provided lower than a refractive index of the outer layer, and the optical Fan-In enters the pumping light to an area other than the center axis of the first cladding on one end face of the first cladding.

It is found by the present inventors that in the case where this configuration is provided, pumping light propagated through the core is increased as compared with the case where the center axis of the first cladding is defined as the incident point of pumping light. Therefore, it is possible to improve the density of pumping light in the cores, and as a result, it is possible to improve the efficiency of the amplification of communication light.

Moreover, preferably, the optical Fan-In enters the pumping light to an outer layer area on one end face of the first cladding, or to an area other than a inner layer area on an inner side with respect to the plurality of cores in the outer layer area.

It is found by the present inventors that in the case where this configuration is provided, pumping light can be concentrated on the outer layer in which the core is provided as the main part of pumping light is not distributed in the inner layer. Therefore, it is possible to further improve the density of pumping light in the cores, and as a result, it is possible to further improve the efficiency of the amplification of communication light.

Effect of Invention

Accordingly, according to the present invention, it is to provide an amplifying optical fiber and an optical amplifier that can amplify communication light while suppressing crosstalk.

DESCRIPTION OF EMBODIMENTS (1) First Embodiment

A first embodiment preferred to the present invention will be described in detail with reference to the drawings.

<Configuration of an Optical Amplifier>

Figure 1:
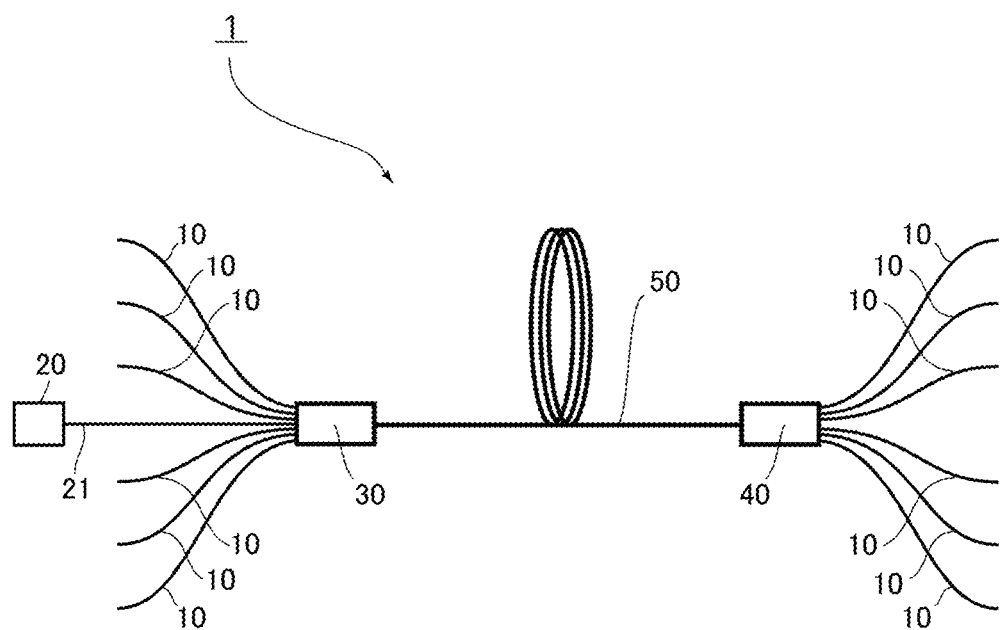
FIG. 1 is a diagram of an optical amplifier according to a first embodiment.

FIG. 1 is a diagram of an optical amplifier according to the first embodiment. As illustrated in FIG. 1, an optical amplifier 1 according to the embodiment includes a plurality of single core optical fibers 10, a pumping light source 20, an optical Fan-In 30, an optical Fan-Out 40, and an amplifying optical fiber 50 as a main configuration.

The single core optical fiber 10 is a single mode fiber that transmits communication light and has a structure in which a single core is enclosed by a cladding. The number of the single core optical fibers 10 is the same as the number of cores in the amplifying optical fiber 50.

The pumping light source 20 emits pumping light, which is a semiconductor laser device or a fiber laser device such as a Fabry-Perot type and a fiber ring type, for example.

The optical Fan-In 30 enters communication light incident on the individual cores of the plurality of the single core optical fibers 10 to the end face of the core of the amplifying optical fiber 50 corresponding to the core, and enters pumping light emitted from the pumping light source 20 to the center of one end face of the amplifying optical fiber 50.

The optical Fan-Out 40 emits communication light incident on a plurality of the individual cores of the amplifying optical fiber 50 to the end face of the core of the single core optical fiber 10 corresponding to the core.

Figure 2A:
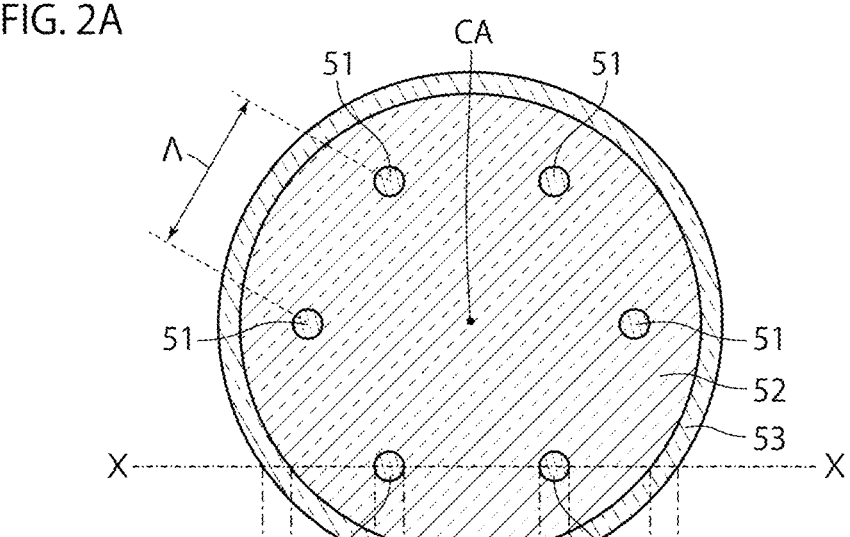
FIGS. 2A and 2B are diagrams of a cross section perpendicular to the longitudinal direction of an amplifying optical fiber.
Figure 2B:
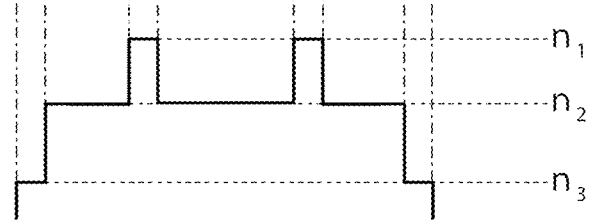

FIGS. 2A and 2B are a diagram of a cross section of the amplifying optical fiber 50 perpendicular to the longitudinal direction. More specifically, FIG. 2A is the structure of one end face of the amplifying optical fiber 50, and FIG. 2B is the refractive index profile on line X-X in FIG. 2A.

As illustrated in FIG. 2A, the amplifying optical fiber 50 includes a plurality of cores 51, a first cladding 52 that encloses the plurality of cores 51 with no gap, and a second cladding 53 that encloses the first cladding 52 as main components.

The plurality of cores 51 is disposed around the center axis CA of the first cladding 52 in the state in which an inter-core distance $\Lambda$ (a distance between the center axes of two cores adjacent to each other) is equal between the cores adjacent to each other. The center axis CA of the first cladding 52 is also the center axis of the amplifying optical fiber 50.

It is noted that FIGS. 2A and 2B illustrate the case of six cores 51, in which a distance from the center axis of each of the cores 51 to the center axis CA of the first cladding 52 is made equal. In other words, the six cores 51 are equally disposed on the circumference of a circle about the center axis CA of the first cladding 52.

An active element is doped to the plurality of cores 51 individually. The active element includes a rare earth element such as erbium (Er), ytterbium (Yb), or neodymium (Nd), for example. Moreover, the active element other than the rare earth element includes bismuth, for example. It is noted that one type of active element may be doped to the core 51 or two types or more may be doped.

As illustrated in FIG. 2B, a refractive index $n_1$ of the core 51 is provided higher than a refractive index $n_2$ of the first cladding 52, and the refractive index $n_2$ of the first cladding 52 is provided higher than a refractive index $n_3$ of the second cladding 53.

Materials of the first cladding 52 and the second cladding 53 include silica glass and a resin, for example. It is noted that from the viewpoint of increasing the difference between the refractive index $n_2$ of the first cladding 52 and the refractive index $n_3$ of the second cladding 53, preferably, the material of the first cladding 52 is silica glass, and the material of the second cladding 53 is a resin. Moreover, from the viewpoint of increasing the difference between the refractive index $n_2$ of the first cladding 52 and the refractive index $n_3$ of the second cladding 53, preferably, the second cladding 53 includes a plurality of vacancies. The second cladding 53 including a plurality of vacancies can be formed using a resin including a plurality of hollow particles, for example.

In the case of the embodiment, expression (1) above is satisfied, where the inter-core distance between the cores 51 adjacent to each other is defined as $\Lambda$, the mode field diameter of the cores 51 is defined as MFD, the cutoff wavelength is defined as $\lambda c$, and the wavelength of communication light incident on the core 51 is defined as $\lambda op$.

<Operation and Effect>

In the optical amplifier 1 in the configuration above, communication light having a wavelength larger than the cutoff wavelength of a cable defined in ITU-T G.650.1, for example, is entered to the individual single core optical fibers 10. The communication light incident on the single core optical fibers 10 is entered to the core end face corresponding to the amplifying optical fiber 50 by the optical Fan-In 30.

On the other hand, pumping light emitted from the pumping light source 20 is guided to the optical Fan-In 30 through a light guide optical fiber 21 (FIG. 1), and is entered to the center axis CA on one end face of the first cladding 52 by the optical Fan-In 30.

This pumping light is propagated through the first cladding 52 and the plurality of cores 51 of the amplifying optical fiber 50, and the pumping light pumps the active element doped to the core 51. The active element in the pumped state causes stimulated emission by the communication light propagated through the core 51, and the communication light is amplified due to the stimulated emission.

The communication light thus amplified is emitted to the end face of the core of the single core optical fiber 10 by the optical Fan-Out 40, and transmitted to the subsequent stage by the single core optical fiber 10.

Meanwhile, in the amplifying optical fiber 50 according to the embodiment, since the plurality of cores 51 is provided in the first cladding 52, not a little crosstalk is taken place between the cores 51 adjacent to each other.

On this point, in the amplifying optical fiber 50 according to the embodiment, as described above, $\Lambda/\mathrm{MFD}(2\lambda c/(\lambda c+\lambda op))$ is 5.8 or more.

Figure 3:
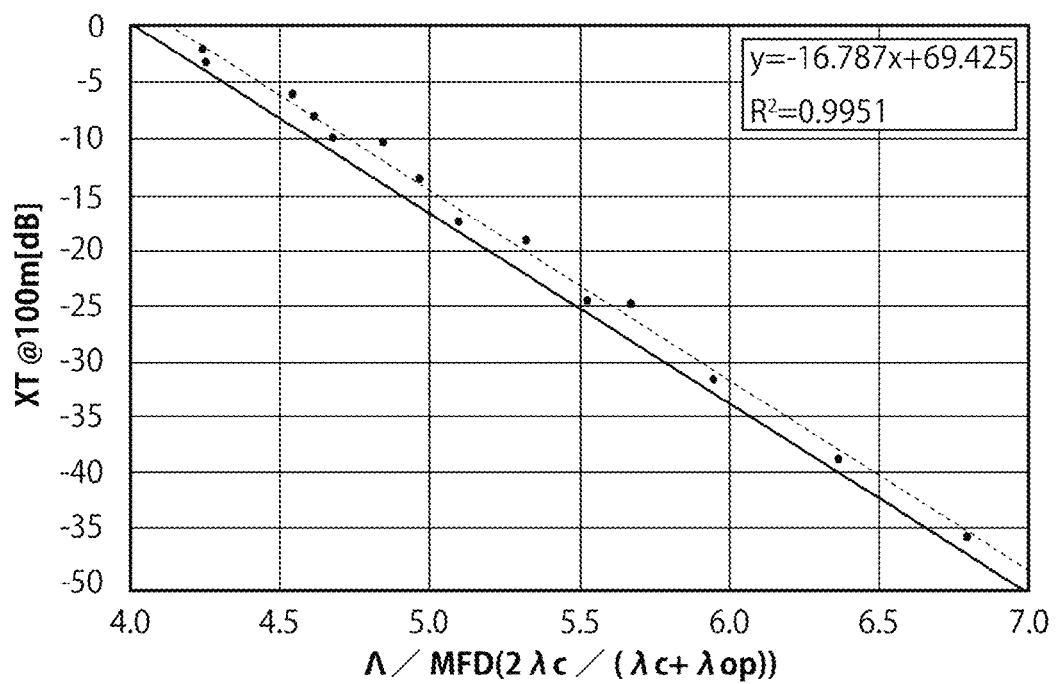
FIG. 3 is a graph of the relationship between the amount of crosstalk in the amplifying optical fiber and the ratio of the inter-core distance between adjacent cores to the mode field diameter of the core in the case of consideration of the cutoff wavelength and the wavelength of communication light.

FIG. 3 is a graph of the relationship between $\Lambda/\mathrm{MFD}$ $(2\lambda c/(\lambda c+\lambda op))$ and the amount of crosstalk.

Points in the graph were obtained by calculating crosstalk according to Optics Express, Vol. 19, Issue 26, pp. B102-B111 (2011). Moreover, a broken line in the graph in FIG. 3 is a linear line closest to the points, and was calculated by a least-squares method. Moreover, a linear line in the graph in FIG. 3 is that the broken line is translated in such a manner that the points do not fall below the slope of the broken line. It is noted that XT expresses the amount of crosstalk at a length of 100 m.

From FIG. 3, $\Lambda/\mathrm{MFD}(2\lambda c/(\lambda c+\lambda op))$ is correlated with the amount of crosstalk XT. In the case where it is found that this $\Lambda/\mathrm{MFD}(2\lambda c/(\lambda c+\lambda op))$ is 5.8 or more, it is revealed that the amount of crosstalk XT is reduced lower than −30 dB, at which it is considered that substantial trouble does not arise in communication.

Moreover, it is known as a qualitative tendency to improve crosstalk by design in which the inter-core distance $\Lambda$ is increased, or the mode field diameter MFD is reduced. It is shown that $(2\lambda c/(\lambda c+\lambda op))$ above converges on one when the cutoff wavelength $\lambda c$ approaches the wavelength $\lambda op$ of signal light. When the cutoff wavelength $\lambda c$ becomes longer, optical confinement to the core 51 becomes stronger, and it can be understood that crosstalk between cores is qualitatively improved.

Therefore, in the embodiment, it is possible to prevent trouble from arising in communication caused by crosstalk, and as a result, it is possible to amplify communication light while suppressing crosstalk.

On the other hand, generally, the optical fiber is often disposed in the bent state. In the case where the optical fiber is disposed in this state, the outer diameter of the first cladding 52 is preferably 225 μm or less in order to suppress the probability of breaking of the optical fiber. This is described in detail in "Large-effective-area ten-core fiber with cladding diameter of about 200 μm" Optics Letters, Vol. 36 Issue 23, pp. 4626-4628 (2011).

On this point, in the amplifying optical fiber 50 according to the embodiment, $\Lambda/\mathrm{MFD}(2\lambda c/(\lambda c+\lambda op))$ is eight or less as described above.

It was experimentally revealed that in the case where this configuration is provided, the amount of crosstalk can be suppressed to the extent that substantial trouble does not arise in communication even though the outer diameter of the first cladding is 225 μm or less in order to suppress the probability of breaking of the optical fiber when the intercore distance Λ, the mode field diameter MFD, the cutoff wavelength λc, and the wavelength λop of communication light are ones generally adopted.

Accordingly, in the embodiment, it is possible to practically prevent trouble from arising in communication caused by crosstalk, and as a result, it is possible to amplify communication light while suppressing crosstalk.

(2) Second Embodiment

Next, a second embodiment preferred to the present invention will be described in detail with reference to the drawings. However, in the second embodiment, components the same as or equivalent to the components of the optical amplifier 1 according to the first embodiment are designated the same reference numerals and signs, and the overlapping description is appropriately omitted.

<Configuration of an Optical Amplifier>

Figure 4A:
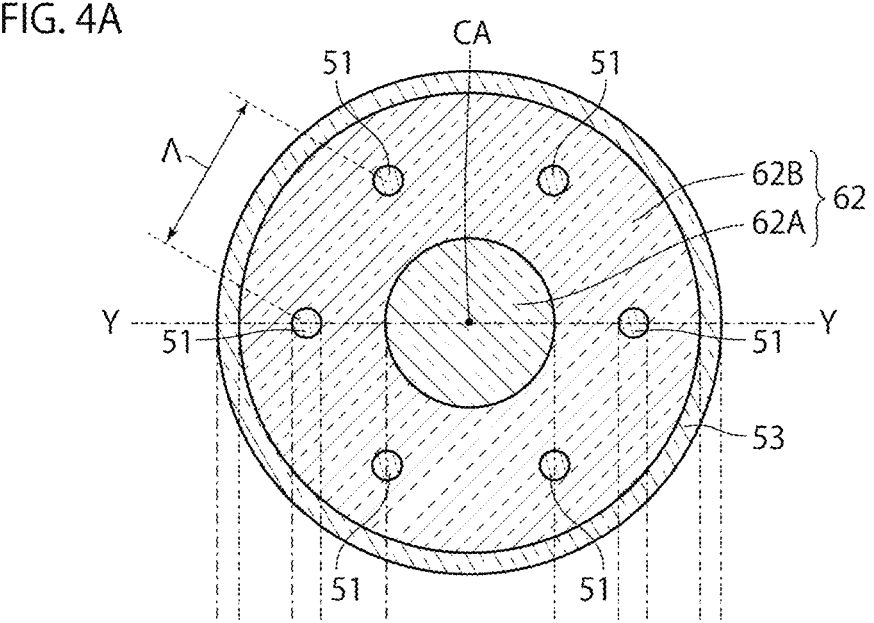
FIGS. 4A and 4B are diagrams of the cross section of an amplifying optical fiber for use in an optical amplifier according to a second embodiment.
Figure 4B:
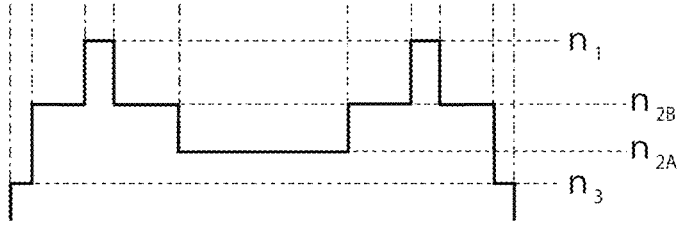

FIGS. 4A and 4B are a diagram of the cross section of an amplifying optical fiber for use in an optical amplifier according to a second embodiment. More specifically, FIG. 4A is the structure of one end face of an amplifying optical fiber, and FIG. 4B is the refractive index profile taken along line Y-Y in FIG. 4A.

In the optical amplifier according to the embodiment, the structure of an amplifying optical fiber 50 is different from the optical amplifier 1 according to the first embodiment.

That is, as illustrated in FIGS. 2A and 2B, the first cladding 52 according to the first embodiment has a single layer structure having the refractive index $n_2$.

On the other hand, as illustrated in FIGS. 4A and 4B, a first cladding 62 according to the embodiment has a two-layer structure including a solid inner layer 62A passed through the center axis CA of the first cladding 62 and an outer layer 62B enclosing the inner layer 62A and cores 51 with no gap. A refractive index $n_{2A}$ of the inner layer 62A is provided lower than a refractive index $n_{2B}$ of the outer layer 62B.

Moreover, in the optical amplifier according to the embodiment, the incident point of pumping light to be entered to the amplifying optical fiber 50 is different from the optical amplifier 1 according to the first embodiment.

That is, as illustrated in FIGS. 2A and 2B, in the first embodiment, the center axis CA on one end face of the first cladding 52 is the incident point of pumping light.

Figure 5A:
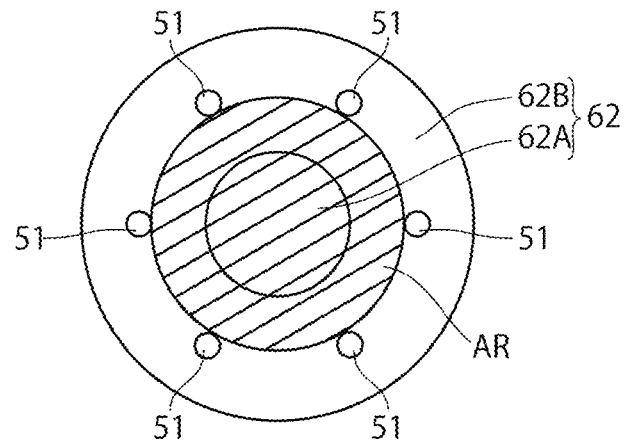
FIGS. 5A to 5C are diagrams for explaining a region on one end face of the first cladding.
Figure 5B:
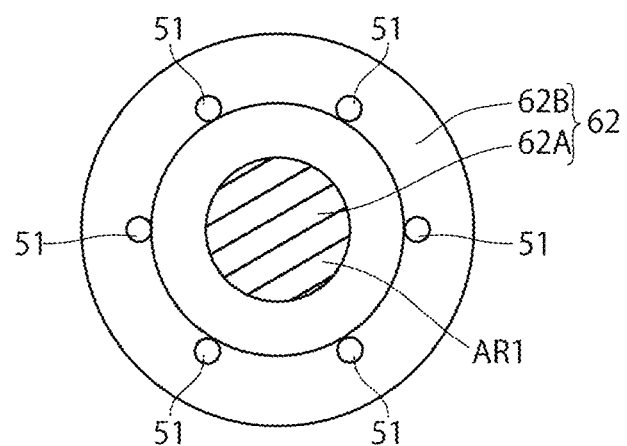

On the other hand, as illustrated in FIGS. 5A and 5B, in the embodiment, an area other than a inner layer area AR1 (FIG. 5B) is the incident point of pumping light in an area AR (FIG. 5A) located on the inner side of the cores 51 on one end face of the first cladding 62.

Figure 5C:
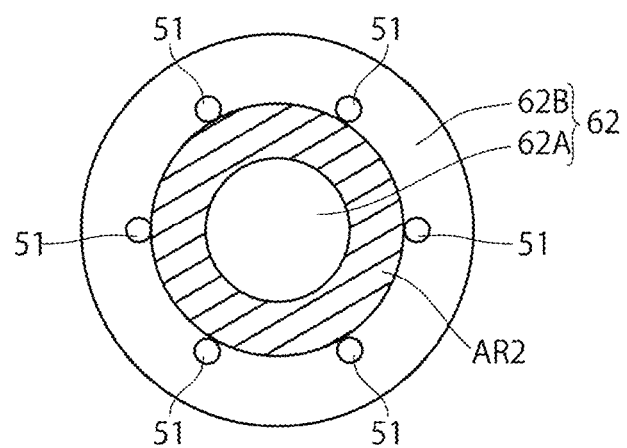

In other words, as illustrated in in FIG. 5C, an outer layer area AR2 surrounded by a circle inscribed on the inner side of the circumferential surfaces of the cores 51 and the circumference of the inner layer area AR1 is defined as the incident point of pumping light.

<Operation and Effect>

Figure 6:
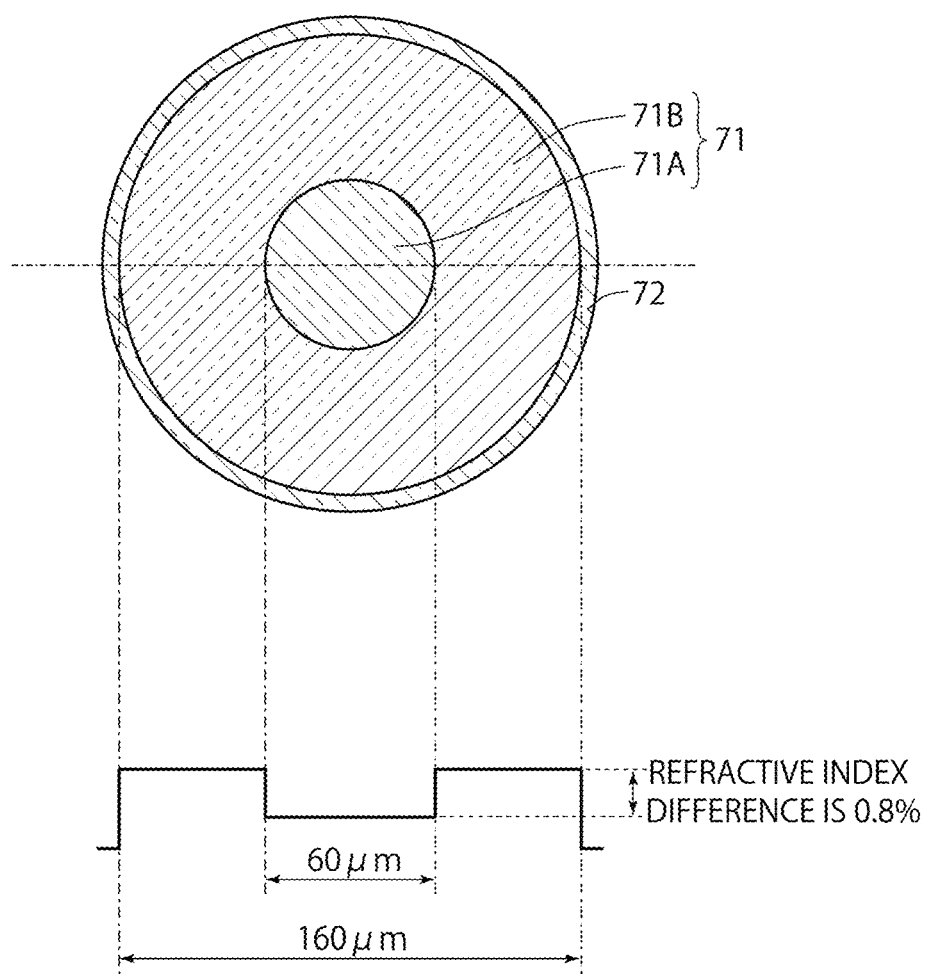
FIG. 6 is a diagram of the structure of an experimental fiber from a view point the same as the view point in FIGS. 4A and 4B.

FIG. 6 is a diagram of the structure of an experimental fiber from a view point the same as the view point in FIGS. 4A and 4B. As illustrated in FIG. 6, an experimental fiber 70 is formed of a silica glass layer 71 corresponding to the first cladding 62 and a low refractive index layer 72 corresponding to the second cladding 53.

The silica glass layer 71 has a two-layer structure including an inner layer 71A and an outer layer 71B similarly to the first cladding 62. It is noted that the cores 51 provided in the outer layer 62B of the amplifying optical fiber 50 according to the embodiment are omitted in the outer layer 71B of the experimental fiber 70.

FIGS. 7A, 7B, 8A and 8B are results that monitor a spread of pumping light in the experimental fiber 70 in the case of varying the incident point of pumping light to be entered to the experimental fiber 70.

It is noted that the pumping light source was an LED light source in a band of 1,300 nm whose center of the wavelength was 1,280 nm and pumping light was entered to one end face of the experimental fiber 70 from the pumping light source through a GI (graded-index) type fiber.

Figure 7A:
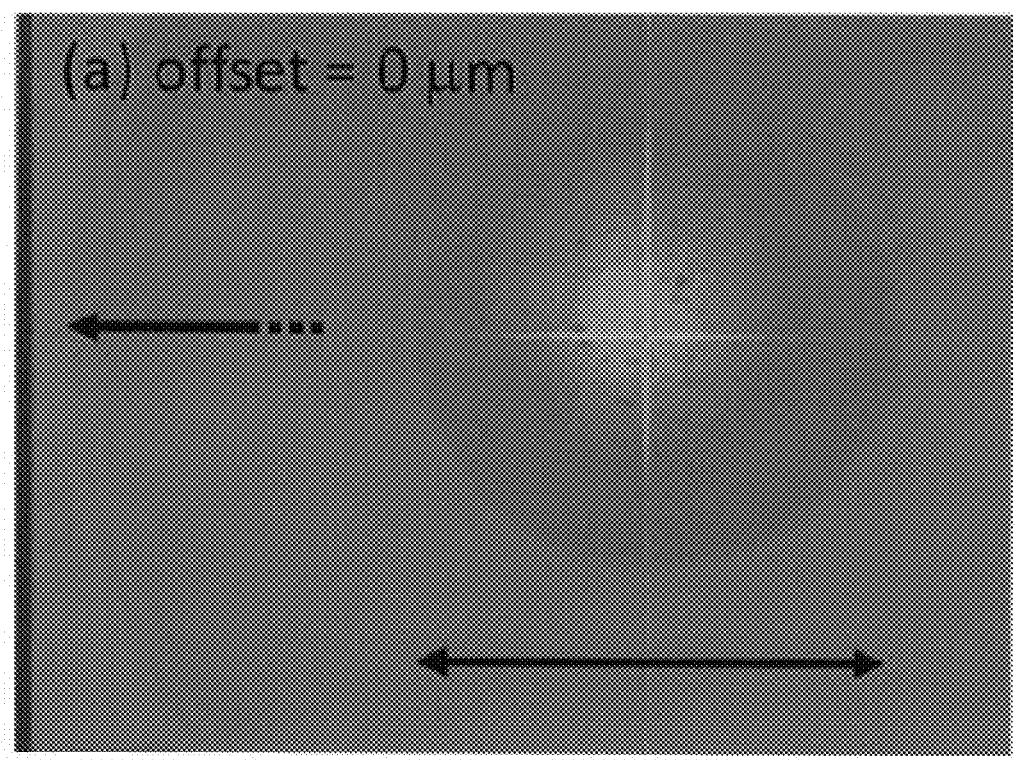
FIGS. 7A and 7B are diagrams of result (1) that monitors a spread of pumping light in the experimental fiber in the case of varying the incident point of pumping light to be entered to the experimental fiber.

As illustrated in FIG. 7A, in the case where the center axis of one end face of the experimental fiber 70 is set to the incident point of pumping light, the pumping light is trapped in the inner layer 71A of the silica glass layer 71.

Figure 7B:
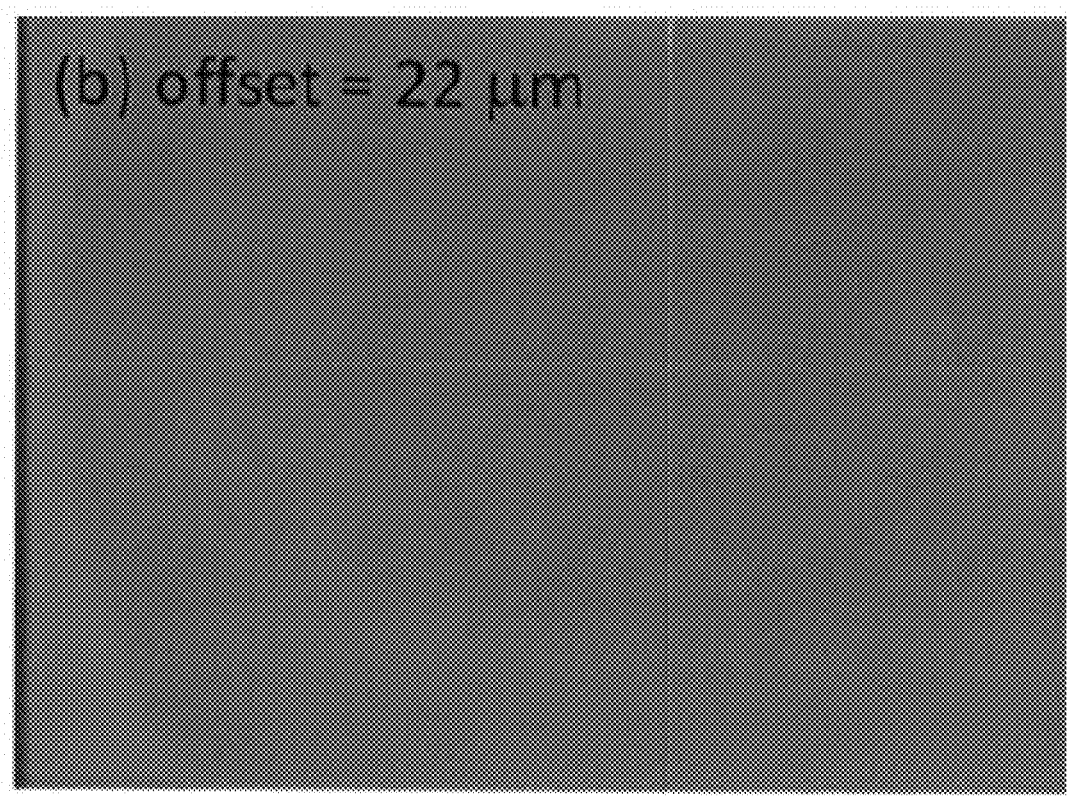

On the other hand, as illustrated in FIG. 7B, in the case where the position shifted 22 μm from the center axis of one end face of the experimental fiber 70 is set to the incident point of pumping light, the pumping light does not stay in the inner layer 71A of the silica glass layer 71 and spreads to the outer layer 71B.

Figure 8A:
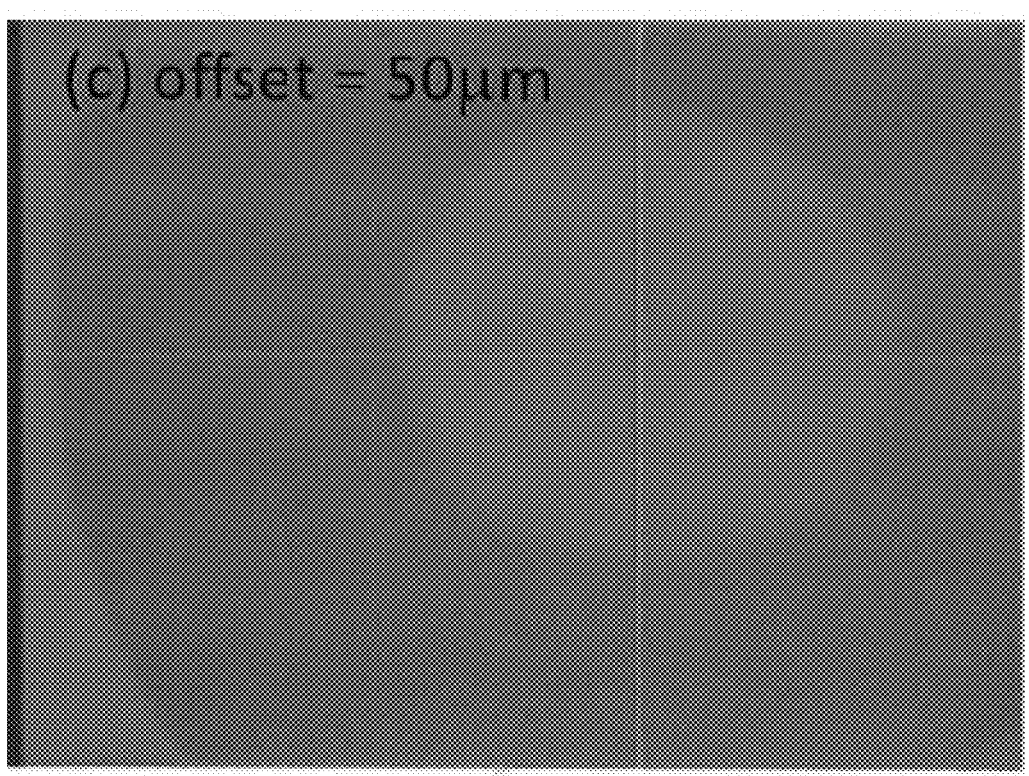
FIGS. 8A and 8B are diagrams of result (2) that monitors a spread of pumping light in the experimental fiber in the case of varying the incident point of pumping light to be entered to the experimental fiber.
Figure 8B:
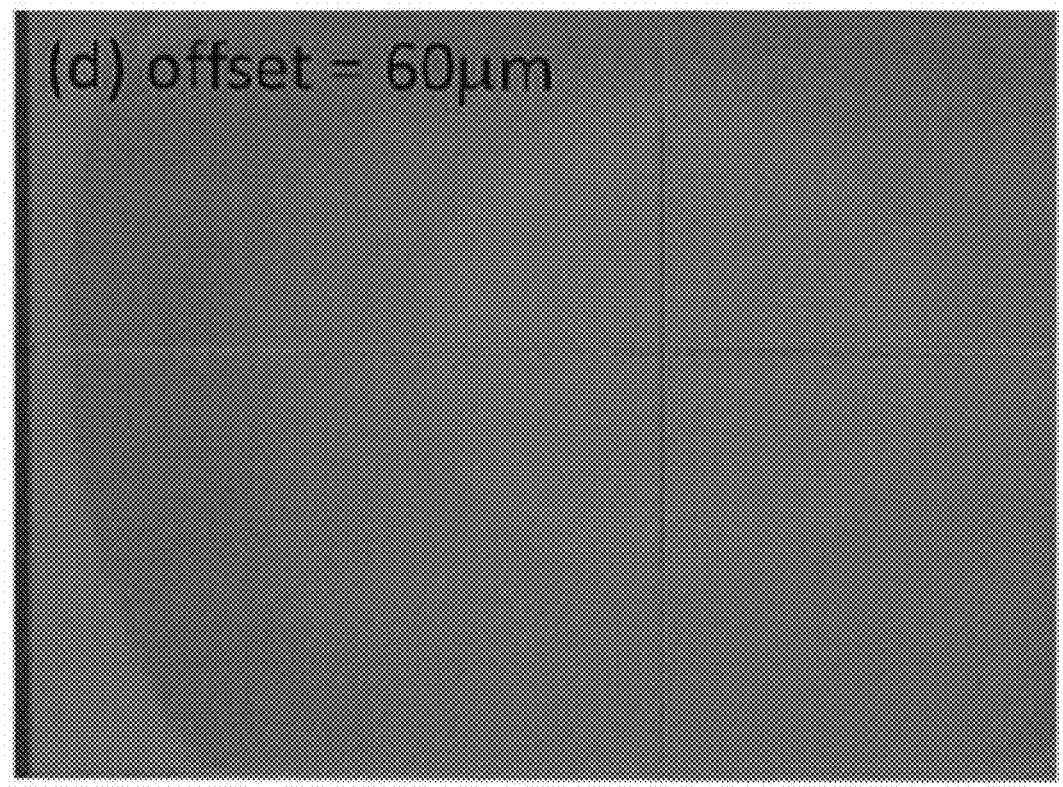

Moreover, as illustrated in FIGS. 8A and 8B, in the case where the incident point of pumping light is located in the outer layer 71B, the most part of the pumping light is not distributed in the inner layer 71A and is concentrated on the outer layer 71B.

From FIGS. 7A, 7B, 8A and 8B, it is revealed that the outer layer 71B whose refractive index is higher than the refractive index of the inner layer 71A is defined as the incident point of pumping light and pumping light can be concentrated on the outer layer 71B.

In the case of the amplifying optical fiber 50 according to the embodiment, the structure of the first cladding 62 is the two-layer structure formed of the inner layer 62A and the outer layer 62B whose refractive index $n_{2B}$ is higher than the refractive index $n_{2A}$ of the inner layer 62A, as illustrated in FIGS. 4A and 4B, and the outer layer area AR2 is defined as the incident point of pumping light as illustrated in FIG. 5C.

Thus, pumping light can be concentrated on the outer layer 62B in which the cores 51 are provided, and the density of pumping light in the cores 51 can be improved. Accordingly, in accordance with the amplifying optical fiber 50 according to the embodiment, it is possible to improve the efficiency of the amplification of communication light.

Moreover, it is confirmed that pumping light propagated through the core 51 is increased as compared with the case of the first embodiment if only the incident point of pumping light is located other than the center axis CA of the first cladding 62, even in the case where the area other than the inner layer area AR1 (FIG. 5B), or the inner layer area AR1 (FIG. 5B) and the outer layer area AR2 (FIG. 5C) are defined as the incident point of pumping light.

(3) Other Embodiments

As described above, the first embodiment and the second embodiment are described as examples. However, the present invention is not limited to the foregoing first embodiment and second embodiment.

For example, in the foregoing embodiments, the examples are shown in which six cores 51 are disposed on the circumference of a circle based on the center axis CA of the first cladding 52 (or the first cladding 62). However, as illustrated in an example in FIG. 9, a plurality of cores 51 may be disposed on any one or both of the apexes and sides of a regular polygon based on the center axis CA of a first cladding 52 (or a first cladding 62). It is noted that FIG. 9 is an example in which 12 cores are disposed on the apexes and the center of sides of a hexagon based on the center axis CA of the first cladding 52 (or the first cladding 62).

Moreover, in the foregoing embodiments, the incident point of pumping light to be entered to one end face of the first cladding 52 or 62 is defined as one. However, the incident point of pumping light may be two or more as in an example illustrated in FIGS. 10A and 10B.

Figure 9:
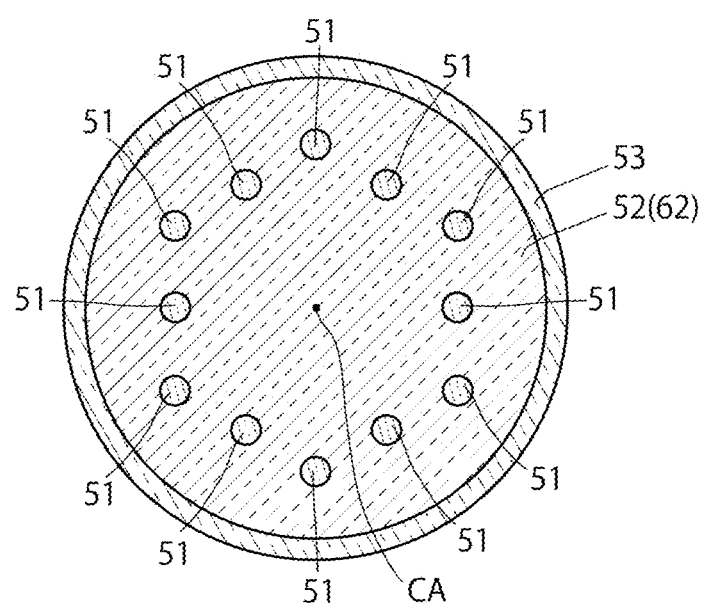
FIG. 9 is a diagram of the cross section of an amplifying optical fiber different in the number of cores and in the core disposition.
Figure 10A:
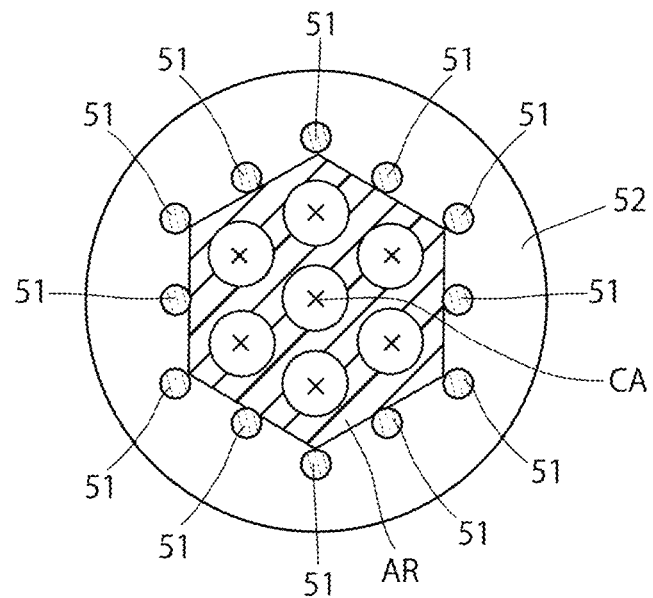
FIGS. 10A and 10B are diagrams of the case where a plurality of incident positions of pumping light is provided.
Figure 10B:
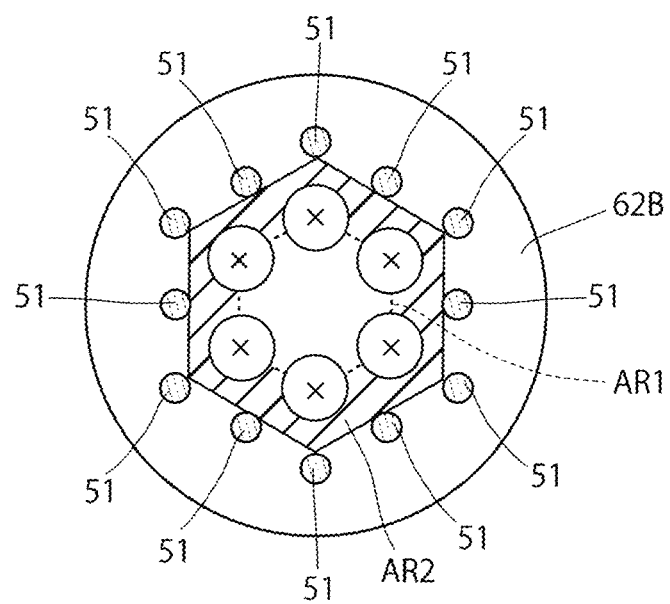

More specifically, FIG. 10A is the case of the first embodiment in the disposition in the cladding in the example illustrated in FIG. 9, and FIG. 10B is the case of the second embodiment in the disposition in the cladding in the example illustrated in FIG. 9. It is noted that a cross in FIGS. 10A and 10B expresses the incident point of pumping light, and a white circle surrounding the cross expresses the incident area of pumping light.

That is, in the case of the first embodiment, as illustrated in FIG. 10A, the center axis CA and a plurality of positions about the center axis CA of the first cladding 52 can be defined as the incident point of pumping light in the area AR on the inner side of a hexagon inscribed on the inner side of the circumferential surfaces of cores 51. Moreover, in the case of the foregoing second embodiment, as illustrated in FIG. 10B, a plurality of positions about the center axis CA of the first cladding 52 can be defined as the incident point of pumping light in the outer layer area AR2 surrounded by a hexagon inscribed on the inner side of the circumferential surfaces of cores 51 and the inner layer area AR1.

As described above, in the case where a plurality of incident points is provided for pumping light to be entered to the inner side of the cores 51 on one end face of the first cladding 52, pumping efficiency can be improved as compared with the case where a single incident point is provided. It is noted that in the case where a plurality of incident points are provided for pumping light, it is fine that pumping light is entered from the optical Fan-In 30 through the light guide optical fibers 21 in the number corresponding to the number of incident points.

Moreover, in the second embodiment, the outer layer 62B has a single layer structure. However, the outer layer 62B may have a multilayer structure. It is noted that in the case where the outer layer 62B has a multilayer structure, it is necessary to provide a layer structure in which the refractive index of a layer in which the core 51 is provided is the highest and the refractive index of a layer becomes lower as more apart from the layer.

EXAMPLES

The invention will be more concretely described with examples and comparative examples hereinafter, but the invention is not limited thereto.

First Example

As for the foregoing first embodiment, the amount of crosstalk XT between the cores adjacent to each other was measured.

In the example, six cores 51 were disposed on the circumference of a circle based on the center axis of a first cladding 52 as the inter-core distance Λ was defined as 38 μm. Active elements doped to the core 51 were 0.2 wt % Er and 2 wt % Yb, and germanium (Ge), for example, was contained in the core 51 for adjusting the refractive index.

Moreover, the distance between the center of the core 51 and the circumferential surface of the first cladding 52 was defined as 35 μm, the specific refractive index of the core 51 to the first cladding 52 was defend as 1.1%, and the wavelength λop of communication light to be entered to the core 51 was defined as 1,550 nm.

Moreover, a single core optical fiber 10 was connected to the core 51 through an isolator, and light of a multimode laser in a 1.55 μm band was introduced as pumping light through a light guide optical fiber 21 having a diameter of 60 μm in the center axis CA on the end face of the amplifying optical fiber.

In the amplifying optical fiber 50 thus configured, the MFD of the core 51 was 6.2 μm, the cutoff wavelength λc was 1,420 nm, and the amount of crosstalk XT between the cores adjacent to each other was −40 dB.

Second Example

As for the foregoing first embodiment, the amount of crosstalk XT between the cores adjacent to each other was measured.

This example was configured the same as the first example except that 12 cores 51 were disposed on the apexes and the center of sides of a hexagon based on the center axis of a first cladding 52 as the inter-core distance Λ was defined as 38 μm.

In such an amplifying optical fiber 50, the MFD of the core 51 was 6.2 μm, the cutoff wavelength λc was 1,420 nm, and the amount of crosstalk XT between the cores adjacent to each other was −40 dB.

Third Example

As for the foregoing second embodiment, the effect was confirmed that pumping light was concentrated in the first cladding 62.

In the example, the diameter of a first cladding 62 was defined as 218 μm, the diameter of a inner layer 62A was defined as 100 μm, the relative refractive index difference of the inner layer 62A with respect to an outer layer 62B was defined as 0.7%, and the incident point of pumping light was defined as six positions surrounding the inner layer 62A in an outer layer area AR2 as illustrated in FIG. 10B. The example is the same as the second example except this configuration.

In such an amplifying optical fiber 50, it was confirmed that pumping light was concentrated on the outer layer 62B as illustrated in FIG. 8A or 8B.

It is noted that a cross sectional area S of the first cladding 62 is approximately 37,321 μm$^2$, and a cross sectional area S' of the inner layer 62A is 7,853 μm$^2$. Since pumping light is not generally distributed on the inner layer 62A, the area S-S' in which pumping light exists is 29,472 μm$^2$ in the example, and is reduced about 20% as compared with the case of the second example (37,321 μm$^2$). Accordingly, the density of pumping light can be improved.

INDUSTRIAL APPLICABILITY

The present invention is applicable to the field of optical communication.

REFERENCE SIGNS LIST

1 . . . optical amplifier
10 . . . single core optical fiber
20 . . . pumping light source
30 . . . optical Fan-In 40 . . . optical Fan-Out
50 . . . amplifying optical fiber
51 . . . core
52, 62 . . . first cladding
62A . . . inner layer
62B . . . outer layer
53 . . . second cladding

The invention claimed is:
1. An amplifying optical fiber comprising:
a plurality of cores to which an active element is doped;
a first cladding enclosing the plurality of cores with no gap; and
a second cladding enclosing the first cladding, wherein:
the plurality of cores is disposed around a center axis of the first cladding in a state in which an inter-core distance between cores adjacent to each other is equal;
a refractive index of the core is provided higher than a refractive index of the first cladding;
the refractive index of the first cladding is provided higher than a refractive index of the second cladding; and
an expression below is satisfied:

$$5.8 \leq \Lambda/\mathrm{MFD}(2\lambda c/(\lambda c+\lambda op)) \leq 8$$

where the inter-core distance is defined as $\Lambda$, a mode field diameter of the core is defined as MFD, a cutoff wavelength is defined as $\lambda c$, and a wavelength of communication light incident on the core is defined as $\lambda op$.

2. The amplifying optical fiber according to claim 1, wherein:
the first cladding has a two-layer structure formed of a solid inner layer passed through the center axis of the first cladding and an outer layer enclosing the inner layer and the plurality of cores with no gap; and
a refractive index of the inner layer is provided lower than a refractive index of the outer layer.

3. The amplifying optical fiber according to claim 2, wherein an area other than the center axis of the first cladding on one end face of the first cladding is an incident point of pumping light.

4. The amplifying optical fiber according to claim 3, wherein an outer layer area on one end face of the first cladding is an incident point of the pumping light.

5. The amplifying optical fiber according to claim 4, wherein an area other than a inner layer area located on an inner side with respect to the plurality of cores is an incident point of pumping light in the outer layer area.

6. An optical amplifier comprising:
an amplifying optical fiber including:
a plurality of cores to which an active element is doped;
a first cladding enclosing the plurality of cores with no gap; and
a second cladding enclosing the first cladding;
a pumping light source configured to emit pumping light for pumping the active element;
a plurality of single core optical fibers to which communication light is entered; and
an optical Fan-In configured to enter communication light incident on cores of the plurality of single core optical fibers to an end face of a core of the amplifying optical fiber corresponding to the core and to enter pumping light source emitted from the pumping light to a predetermined position on one end face of the amplifying optical fiber, wherein:
the plurality of cores is disposed around a center axis of the first cladding in a state in which an inter-core distance between cores adjacent to each other is equal;
a refractive index of the core is provided higher than a refractive index of the first cladding;
the refractive index of the first cladding is provided higher than a refractive index of the second cladding; and
an expression below is satisfied:

$$5.8 \leq \Lambda/\mathrm{MFD}(2\lambda c/(\lambda c+\lambda op)) \leq 8$$

where the inter-core distance is defined as $\Lambda$, a mode field diameter of the core is defined as MFD, a cutoff wavelength is defined as $\lambda c$, and a wavelength of communication light incident on the core is defined as $\lambda op$.

7. The optical amplifier according to claim 6, wherein:
the first cladding has a two-layer structure formed of a solid inner layer passed through the center axis of the first cladding and an outer layer enclosing the inner layer and the plurality of cores with no gap;
a refractive index of the inner layer is provided lower than a refractive index of the outer layer; and
the optical Fan-In enters the pumping light to an area other than the center axis of the first cladding on one end face of the first cladding.

8. The optical amplifier according to claim 7, wherein the optical Fan-In enters the pumping light to an outer layer area on one end face of the first cladding.

9. The optical amplifier according to claim 8, wherein the optical Fan-In enters the pumping light to an area other than a inner layer area on an inner side with respect to the plurality of cores in the outer layer area.

* * * * *